（12）United States Patent
Setterberg

(10) Patent No.: US 11,144,625 B2
(45) Date of Patent: Oct. 12, 2021

(54) FINGERPRINT AUTHENTICATION METHOD AND SYSTEM FOR REJECTING SPOOF ATTEMPTS

(71) Applicant: FINGERPRINT CARDS AB, Gothenburg (SE)

(72) Inventor: Eric Setterberg, Västra Frölunda (SE)

(73) Assignee: FINGERPRINT CARDS AB, Gothenburg (SE)

( * ) Notice: Subject to any disclaimer, the term of this patent is extended or adjusted under 35 U.S.C. 154(b) by 115 days.

(21) Appl. No.: 16/616,856

(22) PCT Filed: May 31, 2018

(86) PCT No.: PCT/SE2018/050550
§ 371 (c)(1),
(2) Date: Nov. 25, 2019

(87) PCT Pub. No.: WO2018/226140
PCT Pub. Date: Dec. 13, 2018

(65) Prior Publication Data
US 2021/0173908 A1  Jun. 10, 2021

(30) Foreign Application Priority Data
Jun. 7, 2017 (SE) .................... 1750720-3

(51) Int. Cl.
*G06F 21/00* (2013.01)
*G06F 21/32* (2013.01)
*G06K 9/00* (2006.01)

(52) U.S. Cl.
CPC ......... *G06F 21/32* (2013.01); *G06K 9/00013* (2013.01); *G06K 9/00087* (2013.01); *G06K 9/00107* (2013.01); *G06F 2221/2149* (2013.01)

(58) Field of Classification Search
None
See application file for complete search history.

(56) References Cited

U.S. PATENT DOCUMENTS

| 8,856,541 B1 * | 10/2014 | Chaudhury | ........ G06K 9/00912 713/186 |
| 10,430,638 B2 * | 10/2019 | Russo | ................ G06K 9/00899 |

(Continued)

FOREIGN PATENT DOCUMENTS

WO   2016037078 A1   3/2016

OTHER PUBLICATIONS

Ibrahim, Anas; Ouda, Abdelkader. A hybrid-based filtering approach for user authentication. 2017 IEEE 30th Canadian Conference on Electrical and Computer Engineering (CCECE). https://ieeexplore.IEEE.org/stamp/stamp.jsp?tp=&arnumber=7946830 (Year: 2017).*

(Continued)

*Primary Examiner* — Jeremiah L Avery
(74) *Attorney, Agent, or Firm* — RMCK Law Group, PLC

(57) ABSTRACT

A method of authenticating a user by means of a fingerprint authentication system comprising a finger sensing arrangement, comprising the following steps for each authentication attempt in a sequence of authentication attempts: receiving a touch by a candidate finger probe on the finger sensing arrangement; acquiring a candidate fingerprint image of the candidate finger probe; determining an authentication representation based on the candidate fingerprint image; retrieving a stored enrollment representation of an enrolled fingerprint of the user; determining a match score based on a comparison between the authentication representation and the enrolment representation; determining a liveness score for the authentication attempt; determining a qualification metric for the authentication attempt based on a relation between the liveness score for the authentication attempt and a liveness score for at least one previous authentication attempt; and determining an authentication result for the (Continued)

authentication attempt based on the match score, and the qualification metric.

13 Claims, 6 Drawing Sheets

(56) References Cited

U.S. PATENT DOCUMENTS

| | | | |
|---|---|---|---|
| 2007/0014443 A1 | 1/2007 | Russo | |
| 2009/0316963 A1 | 12/2009 | Boshra | |
| 2014/0270419 A1 | 9/2014 | Schuckers et al. | |
| 2015/0059003 A1* | 2/2015 | Bouse | H04L 63/102 726/28 |
| 2015/0242605 A1* | 8/2015 | Du | G06F 21/32 726/7 |
| 2015/0347734 A1* | 12/2015 | Beigi | G06F 21/32 713/155 |
| 2016/0232401 A1* | 8/2016 | Hoyos | G06K 9/00107 |
| 2017/0090024 A1 | 3/2017 | Kitchens et al. | |
| 2019/0392145 A1* | 12/2019 | Komogortsev | G06F 21/32 |

OTHER PUBLICATIONS

Smith-Creasey, Max; Rajarajan, Muttukrishnan. A continuous user authentication scheme for mobile devices. 2016 14th Annual Conference on Privacy, Security and Trust (PST). https://ieeexplore.IEEE.org/stamp/stamp.jsp?tp=&arnumber=7906944 (Year: 2016).*

Marasco, E. et al., "A Survey on Antispoofing Schemes for Fingerprint Recognition Systems," ACM Computing Surveys, vol. 47, No. 2, Article 28, Nov. 2014, pp. 28:1-28:36.

PCT International Search Report and Written Opinion dated Oct. 9, 2018 for International Application No. PCT/SE2018/050550, 11 pages.

Zhang, Y. et al., "2D Fake Fingerprint Detection Based on Improved CNN and Local Descriptors for Smart Phone," Network and Parallel Computing, Springer International Publishing AG 2016, pp. 655-662.

Antonelli, A. et al., "Fake Finger Detection by Skin Distortion Analysis," IEEE Transactions on Information Forensics and Security, vol. 1, No. 3, Sep. 2006, pp. 360-373.

Extended European Search Report dated Jan. 28, 2021 for European Application No. 18813465.4, 7 pages.

* cited by examiner

FINGERPRINT AUTHENTICATION METHOD AND SYSTEM FOR REJECTING SPOOF ATTEMPTS

CROSS-REFERENCE TO RELATED APPLICATIONS

This application is a 371 U.S. National Stage of International Application No. PCT/SE2018/050550, filed May 31, 2018, which claims priority to Swedish Patent Application No. 1750720-3, filed Jun. 7, 2017. The disclosures of each of the above applications are incorporated herein by reference in their entirety.

FIELD OF THE INVENTION

The present invention relates to a fingerprint authentication system, and to a method of authenticating a user by means of a fingerprint authentication system.

BACKGROUND OF THE INVENTION

Various types of biometric systems are used more and more in order to provide for increased security and/or enhanced user convenience.

In particular, fingerprint sensing systems have been adopted in, for example, consumer electronic devices, thanks to their small form factor, high performance, and user acceptance.

For continued trust in fingerprint sensing systems, it is important to provide fingerprint sensing systems with high performance in terms of convenience as well as security. In particular, it would be desirable to provide fingerprint sensing systems that are capable of rejecting attempts to get a positive authentication result using a fake finger.

Various fingerprint sensing systems, employing so-called anti-spoofing measures, have been suggested.

For example, US2009/0316963 discloses a fingerprint sensor including a finger sensing area and a controller. The controller aligns authentication data and enrollment data and performs spoof attempt detection based on corresponding pairs of finger features and their spatial locations in the aligned enrollment and authentication data.

However, it would still be desirable to provide for authentication with an improved performance, in particular in respect of rejecting spoofing attempts.

SUMMARY

In view of the above-mentioned and other drawbacks of the prior art, it is an object of the present invention to provide for improved authentication, in particular in respect of rejecting spoofing attempts.

According to a first aspect of the present invention, it is therefore provided a method of authenticating a user by means of a fingerprint authentication system comprising a finger sensing arrangement, the method comprising the steps of, for each authentication attempt in a sequence of authentication attempts: receiving a touch by a candidate finger probe on the finger sensing arrangement; acquiring a candidate fingerprint image of the candidate finger probe; determining an authentication representation based on the candidate fingerprint image; retrieving a stored enrollment representation of an enrolled fingerprint of the user; determining a match score based on a comparison between the authentication representation and the enrolment representation; determining a liveness score for the authentication attempt based on the candidate fingerprint image; determining a qualification metric for the authentication attempt based on a relation between the liveness score for the authentication attempt and a liveness score for at least one previous authentication attempt; and determining an authentication result for the authentication attempt based on the match score, and the qualification metric.

It should be noted that the steps of methods according to embodiments of the present invention need not necessarily be in the order recited in the claims.

It should also be noted that a fingerprint authentication system may be comprised in a stand-alone electronic device, such as a mobile communication device, a watch or a smart card, or may be formed by interconnected devices, such as a computer and a fingerprint acquisition device connected to the computer.

The fingerprint sensing arrangement may, for example, be a capacitive fingerprint sensing arrangement, detecting a measure indicative of the capacitive coupling between each sensing element in an array of sensing elements and a finger surface touching the sensing arrangement surface. Sensing elements at locations corresponding to ridges in the fingerprint will exhibit a stronger capacitive coupling to the finger than sensing elements at locations corresponding to valleys in the fingerprint.

However, the various embodiments of the present invention are not limited to a particular fingerprint sensing technology, but are equally applicable to, for instance, acoustic, optical, thermal or piezo-electric fingerprint sensing arrangements etc.

Furthermore, the fingerprint authentication system according to embodiments of the present invention may be embodied as a system of components, or in a single component, such as an integrated circuit.

The present invention is based upon the realization that only a small portion of a spoof made from a latent fingerprint is likely to be of sufficiently high quality to potentially achieve a successful authentication when conventional template matching is used, and that the most likely way an impostor would use such a spoof would be to move it between authentication attempts to try to align the small high quality portion with the sensing area of the fingerprint sensor using trial and error.

The present inventor has further realized that this expected attack pattern can be identified by, in addition to the match score of the current authentication attempt, evaluating a change in the liveness score between authentication attempts. For instance, a relatively large change in liveness score between successive authentication attempts may indicate an ongoing spoofing attempt, so that the authentication attempt may be determined to be unsuccessful even if the match score taken by itself would indicate a successful authentication. The above-mentioned qualification metric thus indicates an estimated likelihood of an ongoing spoofing attempt. The relation between the liveness score for the current authentication attempt and the liveness score for the at least one previous authentication attempt may advantageously indicate a change in liveness score, and may thus be an indication of a difference (or differences) in liveness score for successive authentication attempts.

The at least one previous authentication attempt may include the most recent authentication attempt directly preceding the current authentication attempt. According to embodiments, the at least one previous authentication attempt may include a plurality of previous authentication attempts, so that the qualification metric provides an indication of a development over time of the liveness score.

Accordingly, embodiments of the present invention strengthen the defenses against spoofing attacks, especially so-called presentation attacks.

According to various embodiments, the above-mentioned qualification metric may be further based on a relation between the match score for the authentication attempt and a match score for at least one previous authentication attempt.

By evaluating combinations of the liveness score and the match score for different authentication attempts, patterns indicating a presentation attack can be identified, increasing the possibility of recognizing and stopping an ongoing spoofing attack.

In various embodiments of the method according to the present invention, the qualification metric may be further based on an estimated movement of the candidate finger probe since a previous authentication attempt.

The property that the candidate finger probe is moved between authentication attempts, to eventually try a rather large area of the candidate finger probe is characteristic to a presentation attack. Further basing the qualification metric on an estimated movement between successive authentication attempts may therefore increase the chances of successfully recognizing an ongoing presentation attack. It should be noted that the movement of a fingerprint pattern is, per se, straight-forward to determine.

Advantageously, the qualification metric may be further based on a time period since said previous authentication attempt. Even more advantageous may be to base the qualification metric on several time periods between successive authentication attempts in the sequence of authentication attempts.

Hereby, additional information can be obtained to aid in the recognition of an ongoing presentation attack. The attacker will typically be aware that he/she will only have a rather small number of attempts before the mobile phone or other electronic device is locked for a certain time, or another form of authentication is required. Therefore, it is likely that authentication attempts during a presentation attack are made with care, so that the time between authentication attempts needs to be more than one or a few seconds.

Further basing the qualification metric on the time between successive authentication attempts may therefore increase the chances of successfully recognizing an ongoing presentation attack.

According to embodiments, the qualification metric may be determined using an empirical model. Such an empirical model may advantageously be determined using machine learning techniques, such as neural networks and/or multivariate statistical analysis etc.

According to embodiments, furthermore, the step of determining the authentication result may comprise the step of: providing, when the match score indicates that the authentication representation matches with the enrollment representation and the qualification metric indicates that a likelihood of an ongoing spoofing attempt is greater than a predefined threshold likelihood, a signal indicating a failed authentication.

In embodiments, the method according to the present invention may further comprise the steps of, for each authentication attempt in the sequence of authentication attempts: when the liveness score for the authentication attempt indicates a likely spoof: providing a signal indicating a failed authentication; determining an anti-spoofing representation based on the candidate fingerprint image; and storing the anti-spoofing representation.

By determining and storing an anti-spoofing representation of a likely spoof, the chances of rejecting subsequent spoofing attempts can be increased further, even when the small high quality portion of a spoof is aligned with the sensing area of the fingerprint sensor.

In embodiments, the method according to the present invention may further comprise the steps of, for each authentication attempt in the sequence of authentication attempts: retrieving a stored anti-spoofing representation associated with a previous authentication attempt; comparing the authentication representation with the anti-spoofing representation associated with the previous authentication attempt; and when the authentication representation matches with the anti-spoofing representation, providing a signal indicating a failed authentication.

Using the stored anti-spoofing representation, the present authentication attempt can be rejected even if the authentication representation matches well with the stored enrollment representation. A good match between the present authentication representation and the stored anti-spoofing representation is an indication that the present authentication attempt is with the same spoof that was identified in the previous (failed) authentication attempt.

Any additional matching requirement (in addition to template matching) may result in an increase of the occurrence of false rejections, which is undesirable. It would therefore be advantageous to only match an authentication representation against an anti-spoofing representation when a presentation attack or similar may reasonably occur and/or to limit the coverage of the stored anti-spoofing representation(s). To that end, it may be advantageous to discard any stored anti-spoofing representation upon receiving an indication of a successful authentication by the user.

This may, in particular, be the case when the successful authentication provides a supplementary indication of user presence, by an alternative authentication method. For instance, the successful authentication may be the result of the entry of a correct passcode (such as a password or PIN-code).

According to a second aspect of the present invention, there is provided a fingerprint authentication system for authenticating a user, comprising: a fingerprint sensing arrangement; a memory; and processing circuitry coupled to the fingerprint sensing arrangement, the processing circuitry being configured to, for each authentication attempt in a sequence of authentication attempts: control the fingerprint sensing arrangement to acquire a candidate fingerprint image of a candidate finger probe; determine an authentication representation based on the candidate fingerprint image; retrieve, from the memory, a stored enrollment representation of an enrolled fingerprint of the user; determine a match score based on a comparison between the first authentication representation and the enrolment representation; determine a liveness score for the authentication attempt based on the candidate fingerprint image; retrieve, from the memory, a stored liveness score associated with at least one previous authentication attempt; determine a qualification metric for the authentication attempt based on a relation between the liveness score for the authentication attempt and the stored liveness score; and determine an authentication result based on the match score and the qualification metric.

The processing circuitry may be realized as hardware and/or as software running on one or several processors.

Further embodiments of, and effects obtained through this second aspect of the present invention are largely analogous to those described above for the first aspect of the invention.

The fingerprint authentication system according to embodiments of the present invention may be included in an electronic device, further comprising a processing unit configured to control the fingerprint authentication system to carry out a fingerprint authentication of a user, and to perform at least one action only upon successful authentication of the user.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the electronic device according to the present invention are mainly discussed with reference to a mobile phone with a substantially square fingerprint sensor being accessible through an opening in the back cover. Furthermore, the fingerprint sensor 3 and the processing circuitry are schematically indicated as being different separate components.

It should be noted that this by no means limits the scope of the present invention, which equally well includes, for example, other types of electronic devices, such as smart watches, smart cards, laptop computers etc. Furthermore, the fingerprint sensing device need not be substantially square, but could be elongated or have any other suitable shape. Moreover, the fingerprint sensing device may be arranged in any suitable location in the electronic device, such as being integrated with a button on the front or the side of the mobile phone, or arranged under a cover glass etc. In addition, the processing circuitry, or parts of the processing circuitry, may be integrated with the fingerprint sensor.

Figures 1A, 1B:
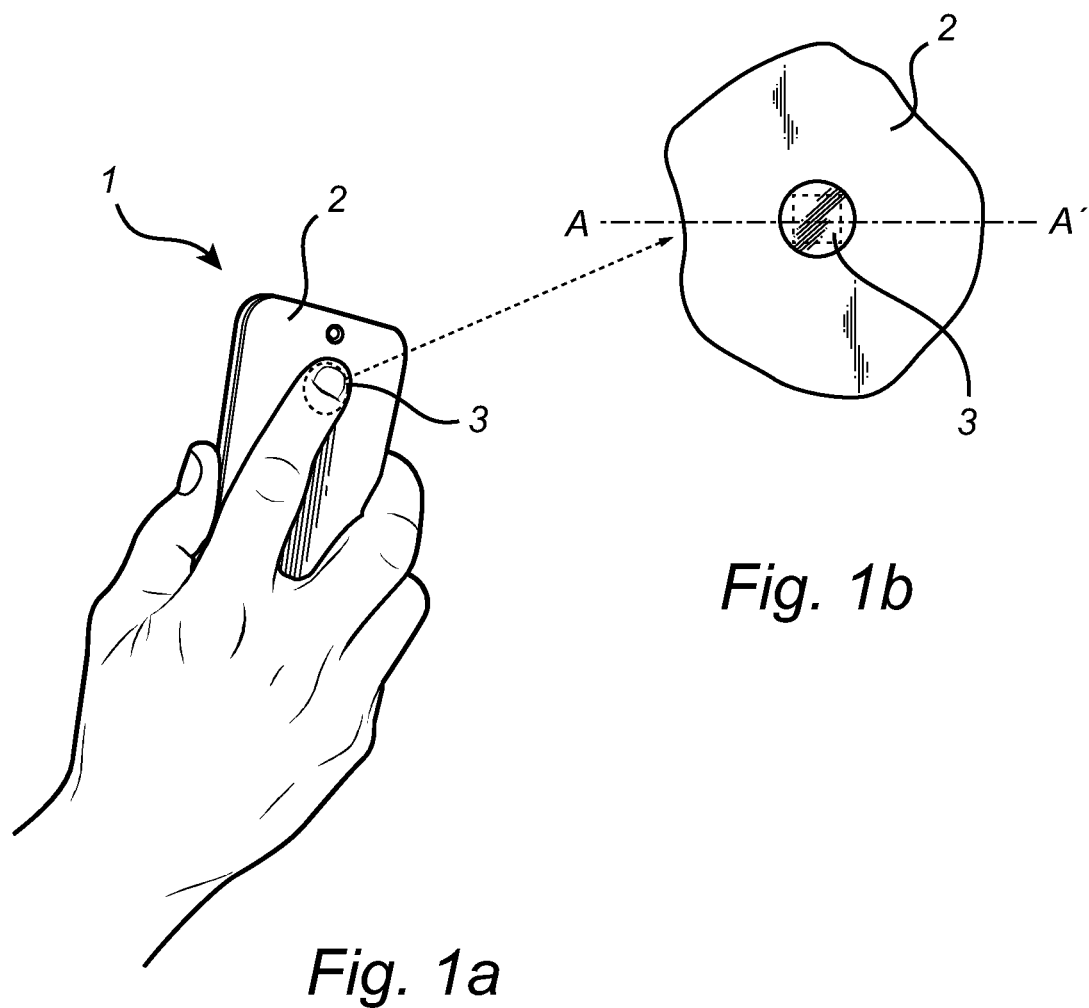
FIGS. 1a-b schematically illustrate an electronic device including a fingerprint sensing device according to an example embodiment of the present invention.

FIG. 1a schematically illustrates an example embodiment of the electronic device according to the present invention, in the form of a mobile phone 1 having a housing 2 and an integrated fingerprint sensor 3 being accessible through an opening in the housing 2. The fingerprint sensor 3 may, for example, be used for unlocking the mobile phone 1 and/or for authorizing transactions carried out using the mobile phone etc.

FIG. 1b is an enlarged view of the fingerprint sensor 3 and its integration with the housing 2.

Figure 2:
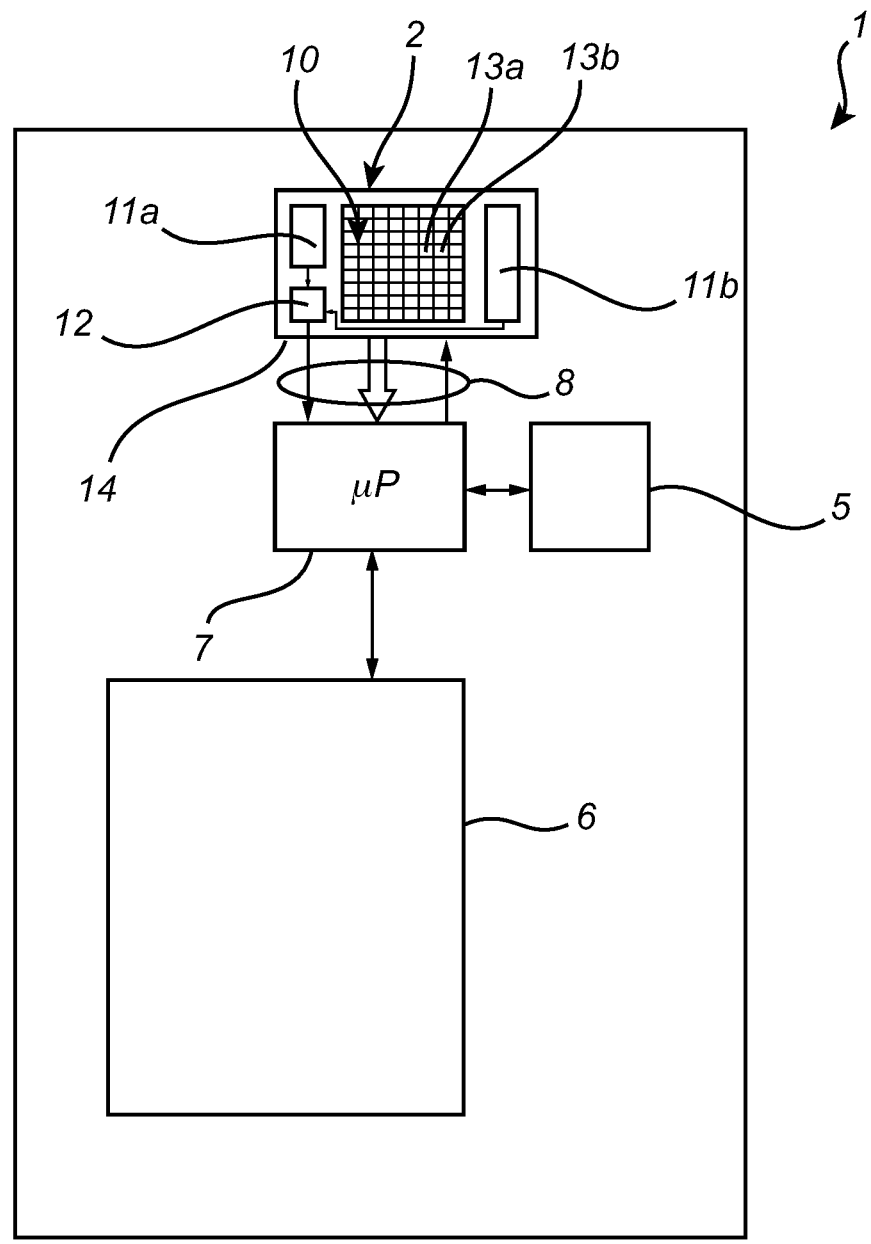
FIG. 2 is a block diagram of the electronic device in FIGS. 1a-b.

With reference to FIG. 2, which is a schematic block-diagram of the mobile phone is FIG. 1a, the mobile phone 1, in addition to the above-mentioned fingerprint sensor 3, comprises communication circuitry 5, user interface circuitry 6, processing circuitry 7, and a fingerprint sensor interface 8, here schematically indicated by the line arrows indicating control signals and the block arrow indicating data transfer.

As is schematically indicated in FIG. 2, the fingerprint sensor 3 comprises a sensor array 10 and finger detecting circuitry, here provided in the form of finger detecting structures 11a-b and a finger detection circuit 12 connected to the finger detecting structures 11a-b. The sensor array 10 includes a plurality of sensing elements 13a-b (only two neighboring sensing elements are indicated with reference numerals in FIG. 2 to avoid cluttering the drawing). The fingerprint sensor 3 further comprises a finger detection output 14 for externally providing a Finger Detect and/or a Finger Lost signal from the finger detection circuit 12. Although not shown in FIG. 2, the fingerprint sensing device 3 additionally comprises readout circuitry for converting sensing signals from the sensing elements to provide a representation of a fingerprint touching the sensor surface. Exemplary readout circuitry will be described further below with reference to FIG. 3.

The above-mentioned communication circuitry 5 may, for example, comprise one or several of various antennas and control units for wireless communication, and the above-mentioned user interface circuitry 6 may, for example, comprise one or several of a display, a microphone, a speaker, and a vibration unit.

Figure 3:
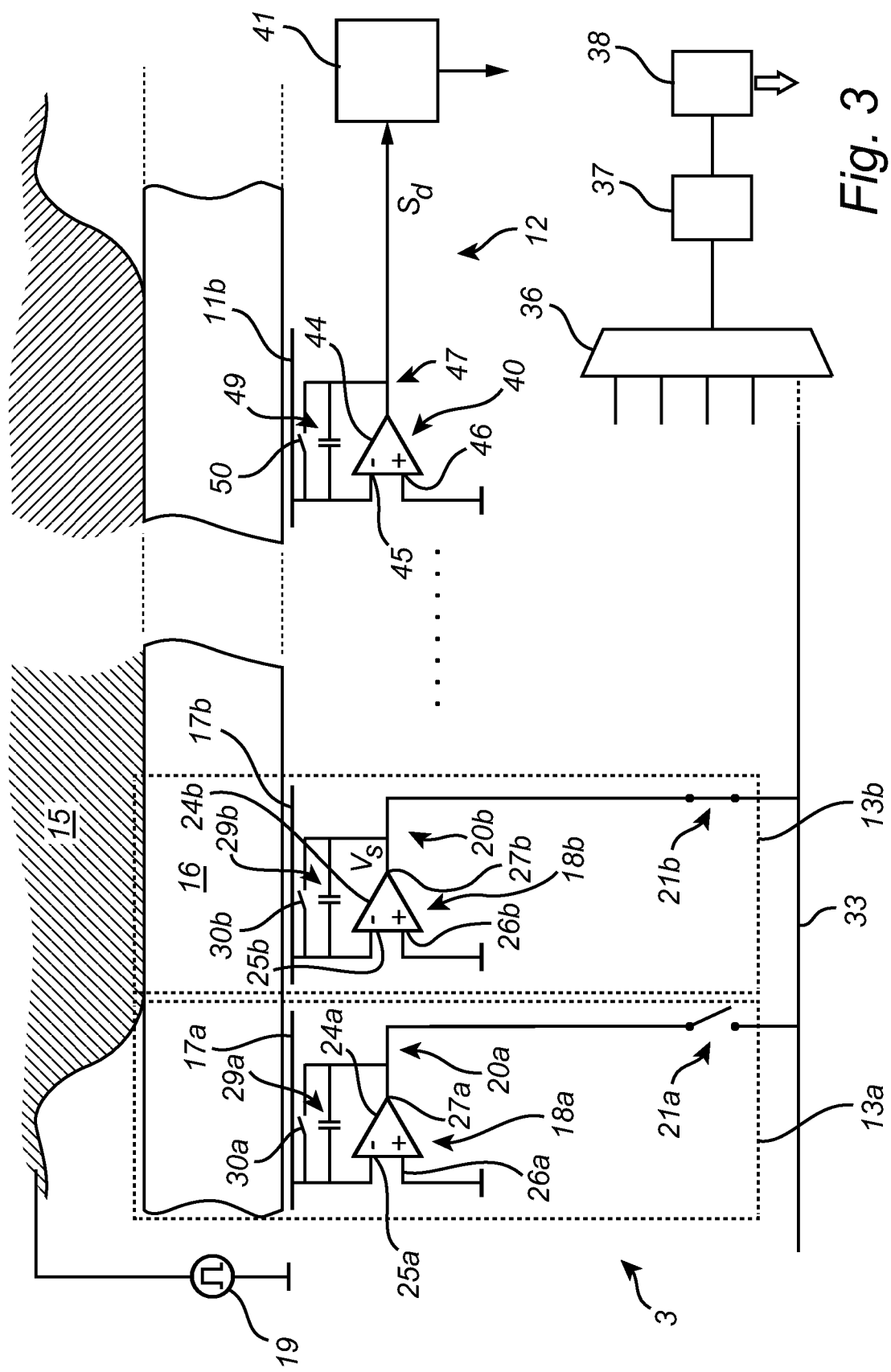
FIG. 3 is a schematic cross-section view of a portion of the fingerprint sensing device in FIG. 1b.

FIG. 3 is a schematic cross section of a portion of the fingerprint sensing device 3 in FIG. 1b taken along the line A-A' with a finger 15 placed on top of a protective dielectric top layer 16 covering the sensor array 5 and the finger detecting structures 11a-b. Referring to FIG. 3, the fingerprint sensing device 3 comprises an excitation signal providing circuit 19 electrically connected to the finger via a conductive finger drive structure (not shown in FIG. 3), a plurality of sensing elements 13a-b, and a finger detection arrangement comprising the finger detecting structure 11b, and the finger detection circuit 12 connected to the finger detecting structure 11b.

As is schematically indicated in FIG. 3, each sensing element 13a-b comprises a conductive sensing structure, here in the form of a metal plate 17a-b underneath the protective dielectric top layer 16, a charge amplifier 18a-b, and selection circuitry, here functionally illustrated as a simple selection switch 21a-b for allowing selection/activation of the respective sensing element 13a-b.

The charge amplifier 18a-b comprises at least one amplifier stage, here schematically illustrated as an operational amplifier (op amp) 24a-b having a first input (negative input) 25a-b connected to the sensing structure 17a-b, a second input (positive input) 26a-b connected to sensor ground or another reference potential, and an output 27a-b. In addition, the charge amplifier 18a-b comprises a feedback capacitor 29a-b connected between the first input 25a-b and the output 27a-b, and reset circuitry, here functionally illustrated as a switch 30a-b, for allowing controllable discharge of the feedback capacitor 29a-b. The charge amplifier 18a-b may be reset by operating the reset circuitry 30a-b to discharge the feedback capacitor 29a-b.

As is often the case for an op amp 24a-b in a negative feedback configuration, the voltage at the first input 25a-b follows the voltage at the second input 26a-b. Depending on the particular amplifier configuration, the potential at the first input 25a-b may be substantially the same as the potential at the second input 26a-b, or there may be a substantially fixed offset between the potential at the first input 25a-b and the potential at the second input 26a-b. In the configuration of FIG. 3, the first input 25a-b of the charge amplifier is virtually grounded.

When a time-varying potential is provided to the finger 15 by the excitation signal providing circuitry 19, a corresponding time-varying potential difference occurs between the sensing structure 17a-b and the finger 15.

The above-described change in potential difference between the finger 15 and the sensing structure 17a-b results in a sensing voltage signal $V_s$ on the output 27a-b of the charge amplifier 18a-b.

When the indicated sensing element 13a-b is selected for sensing, the selection switch 21a-b is closed to provide the sensing signal to the readout line 33. The readout line 33, which may be a common readout line for a row or a column of the sensor array 5 in FIG. 2, is shown in FIG. 3 to be connected to a multiplexer 36. As is schematically indicated in FIG. 3, additional readout lines from other rows/columns of the sensor array 5 may also be connected to the multiplexer 36.

The output of the multiplexer 36 is connected to a sample-and-hold circuit 37 and an analog-to-digital converter 38 in series for sampling and converting the analog signals originating from the sensing elements 13a-b to a digital representation of the fingerprint pattern of the finger 15 on the sensor 2.

As is schematically indicated in FIG. 3, the finger detection circuit 12 here comprises a dedicated finger detecting structure 11b in the form of a metal plate, a charge amplifier 40 and a detection signal processing circuit 41. The charge amplifier 40, which is similar in principle to the charge amplifiers 18a-b comprised in the sensing elements 13a-b described above. Accordingly, the charge amplifier 40 comprises at least one amplifier stage, here schematically illustrated as an operational amplifier (op amp) 44 having a first input (negative input) 45 connected to the finger detecting structure 11b, a second input (positive input) 46 connected to sensor ground or another reference potential, and an output 47. In addition, the charge amplifier 40 comprises a feedback capacitor 49 connected between the first input 45 and the output 47, and reset circuitry, here functionally illustrated as a switch 50, for allowing controllable discharge of the feedback capacitor 49. The charge amplifier may be reset by operating the reset circuitry 50 to discharge the feedback capacitor 49. As is also indicated in FIG. 3, the output of the charge amplifier is a finger detection signal $S_d$ (in the form of a voltage) indicative of the capacitive coupling between the finger 15 and the finger detecting structure 11b.

In FIG. 3, the finger 15 is shown as being connected to an excitation circuit 19 for providing the desired potential difference between the finger, and the sensing plates 17a-b of the sensor array 5 and the finger detecting structure 4a. It should be noted that this desired potential difference may alternatively be provided by changing the ground level of the fingerprint sensing device in relation to the ground level of the electronic device (such as mobile phone 1) in which the fingerprint sensing device 3 is included.

An example embodiment of a method according to an aspect of the present invention will now be described with reference to the flow-chart in FIG. 4 together with illustrations in other figures where applicable.

In a first step 100, a candidate fingerprint image of the candidate finger probe is acquired using the fingerprint sensor 3. The candidate finger probe may be a real finger, or a spoof that may have been manufactured based on a latent print. A schematic illustration of such a spoof 50 is provided in FIG. 5.

Figure 5:
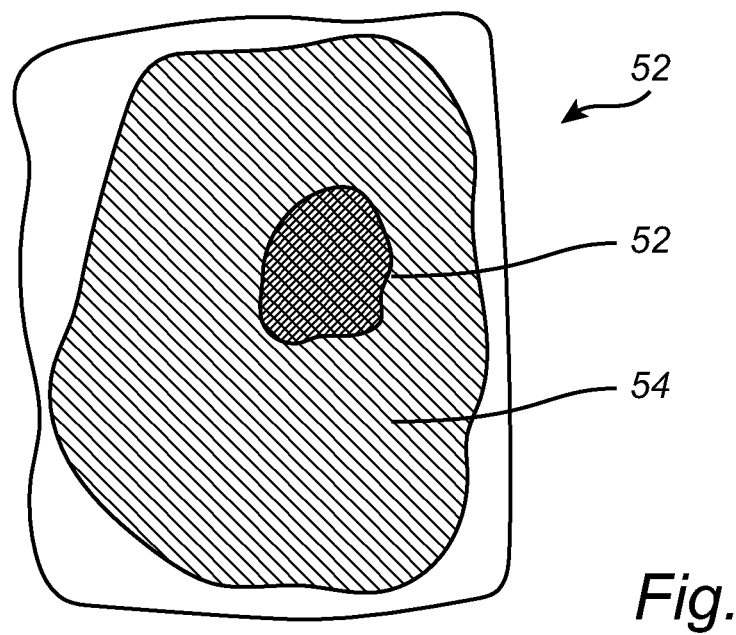
FIG. 5 is a schematic illustration of a spoof.

Referring now briefly to FIG. 5, such a spoof 50 may have a first spoof portion 52 in which the topography is similar to that of the real finger, and a second spoof portion 54 that differs, in various ways, from the real finger.

Figure 6A:
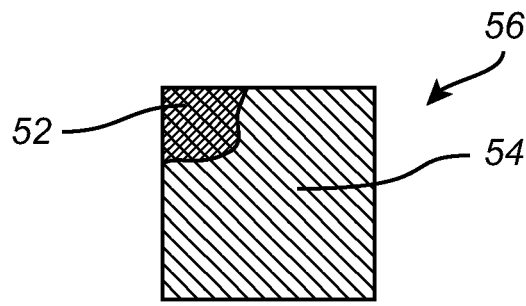
FIGS. 6a-c are schematic representations of candidate fingerprint images acquired in an example sequence of authentication attempts using the spoof in FIG. 5.
Figure 6B:
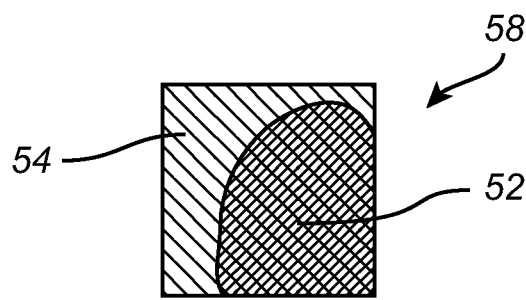

Since the sensing area of the fingerprint sensor 3 is considerably smaller than the candidate finger probe, only a portion of the candidate finger probe will be imaged by the fingerprint sensor 3 as the above-mentioned candidate fingerprint image. Assuming in the following that the candidate finger probe is the spoof 50 in FIG. 5 and that a so-called presentation attack is taking place, a schematic example first fingerprint image 56 acquired in connection with a first authentication attempt is schematically shown in FIG. 6a. FIG. 6b shows a schematic example second fingerprint image 58 acquired in connection with a second authentication attempt, and FIG. 6c shows a schematic example third fingerprint image 60 acquired in connection with a third authentication attempt.

Figure 4:
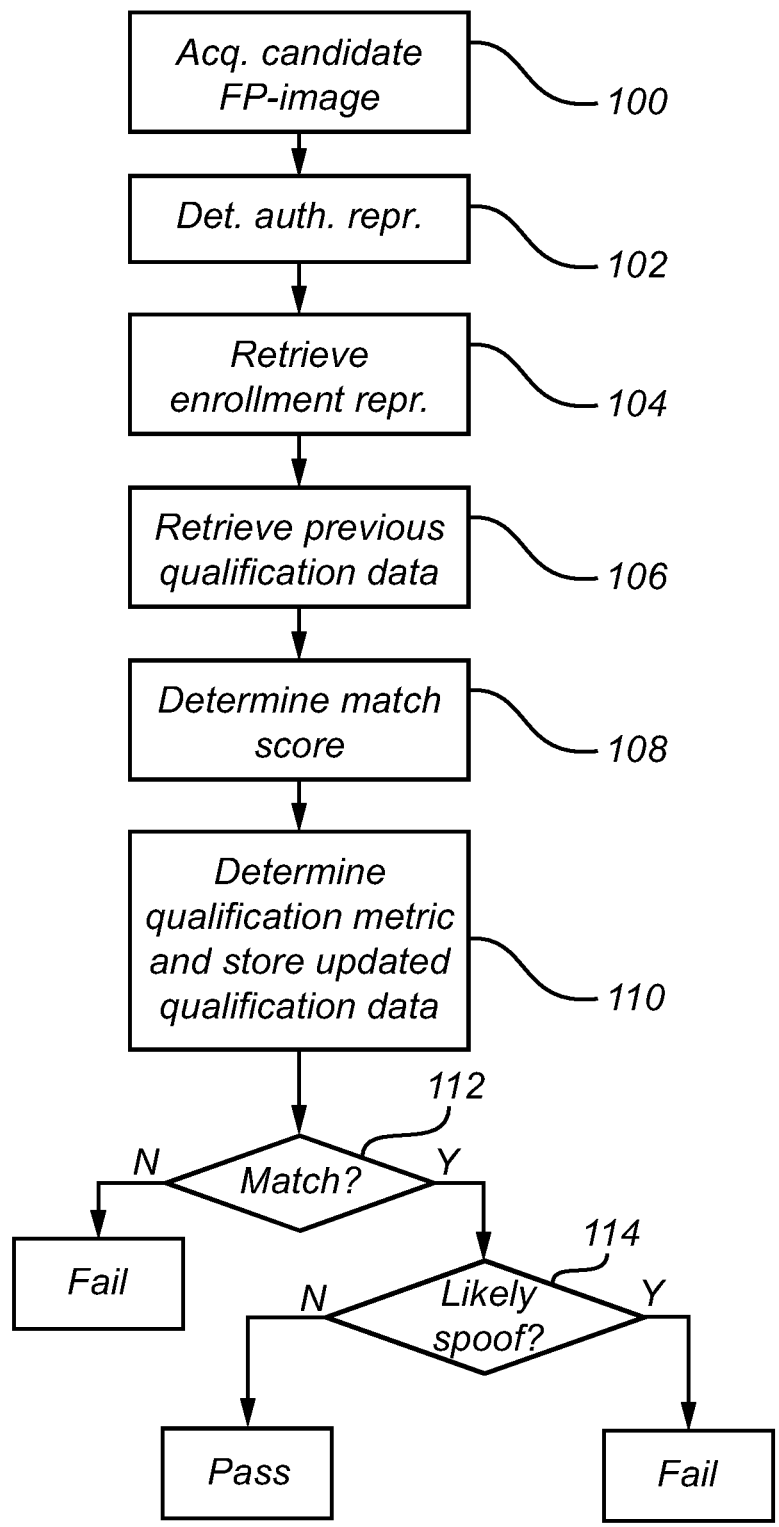
FIG. 4 is a flow-chart schematically illustrating a method according to an example embodiment of the present invention.
Figure 6C:
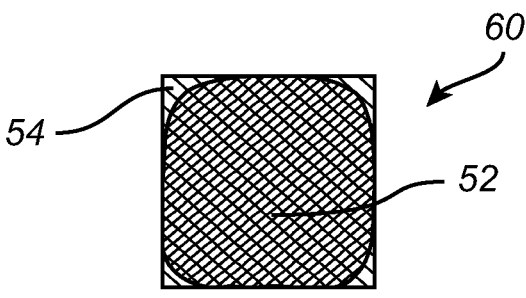

For purposes of illustration, it is here assumed that two previous authentication attempts have been made, based on the first fingerprint image 56 in FIG. 6a and the second fingerprint image 58 in FIG. 6b, respectively, and that the fingerprint image that is acquired in the first step 100 of the flow-chart in FIG. 4 is the third fingerprint image 60 in FIG. 6c.

Returning to the flow-chart in FIG. 4, an authentication representation is determined based on the third candidate fingerprint image 60 in step 102, and a stored enrollment representation of an enrolled fingerprint of the user is retrieved in step 104.

In step 106, qualification data for previous authentication attempts is retrieved. In the present exemplary situation, such qualification data may, for instance, include liveness scores determined in connection with a first authentication attempt based on the first candidate image 56 in FIG. 6a and in connection with a second authentication attempt based on the second candidate image 58 in FIG. 6b. The retrieved qualification data may additionally include match scores determined in connection with the first and second authentication attempts, and/or and an indication of candidate finger probe movement between the first and second authentication attempts, and/or an indication of a time period between the first and second authentication attempts.

In step 108, the authentication representation determined in step 102 is compared with the enrollment representation retrieved in step 104, and a match score is determined based on the comparison. Since various ways of forming suitable biometric representations based on fingerprint images as well as various ways of comparing such biometric representations to determine a match score are well known in the art, no detailed description of this is provided here.

In step 110, a qualification metric QM for the current authentication attempt based on the third fingerprint image 60 in FIG. 6c is determined, the retrieved qualification data is updated based on the current authentication attempt, and the updated qualification data is stored.

The qualification metric QM is determined based on the previous qualification data retrieved in step 106 and qualification data determined in connection with the current authentication attempt, at least including a liveness score for the current authentication attempt.

Concerning the liveness score, there are various well-known ways of determining a liveness score. For instance, the candidate fingerprint image may be analyzed in view of various properties of the enrolled fingerprint, such as ridge dimensions, the presence and distribution of sweat pores, the existence of perspiration etc. According to other known ways of determining a liveness score, auxiliary sensors may be used for detecting one or several properties of the candidate finger probe. It could, for instance, be feasible to use the above-described finger detection circuitry to obtain a measure indicative of electrical properties of the candidate finger probe.

In the next step 112 it is determined whether or not the authentication representation and the enrollment representation match. In particular, the match score determined in step 108 may be compared with a threshold that may be predefined or adaptive.

If it is determined in step 112 that there is no match, it is concluded that the authentication attempt failed, as indicated in FIG. 4.

If it is instead determined in step 112 that there is a match, as may well be the case for the third fingerprint image 60 in FIG. 6c, the method proceeds to step 114 to evaluate the above-mentioned qualification metric QM.

If the evaluation of the qualification metric QM indicates that the candidate finger probe is likely to be a real finger, it is concluded that the authentication attempt was successful, indicated by 'Pass' in FIG. 4. If the evaluation of the qualification metric QM instead indicates that it is likely that there is an ongoing spoofing attempt, it is concluded that the authentication attempt failed, as indicated in FIG. 4.

The qualification metric QM may, for instance, be determined based no a predefined relation between qualification data—including the liveness score—determined for the current authentication attempt and the previous qualification data retrieved in step 106. Alternatively, the qualification metric QM may be determined based on an empirical model that may be continuously improved during use of the fingerprint authentication system.

To determine if the sequence of authentication attempts is in fact a spoofing attack of the presentation type, the qualification metric QM may be determined based on an analysis of qualification data of the authentication attempts of the sequence of authentication attempts, and the thus determined QM may be compared with a threshold, which may be predefined or adaptively determined.

Figure 7:
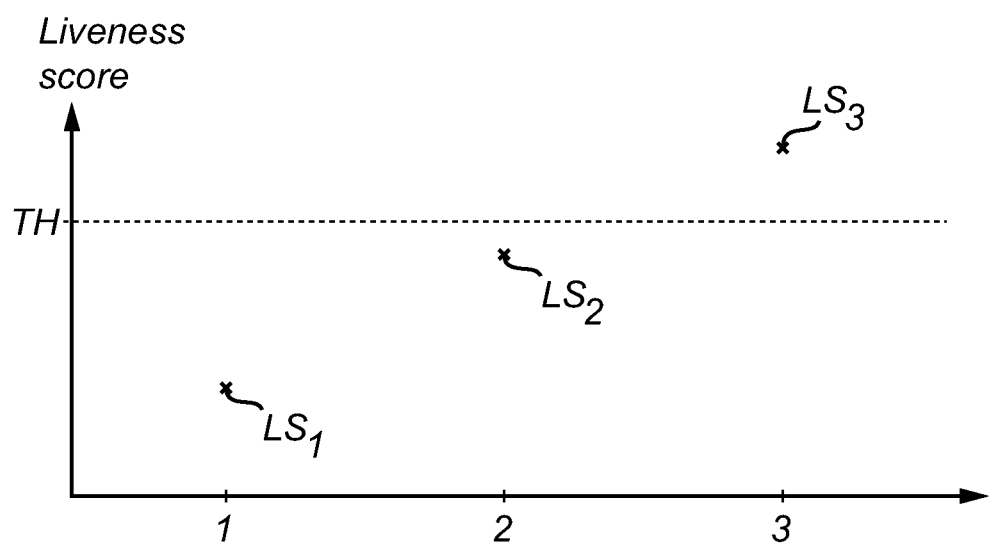
FIG. 7 is a diagram illustrating example liveness scores for the different authentication attempts in FIGS. 6a-c.

A simplified example of how an analysis of qualification data, at least including the liveness scores for the authentication attempts, will now be provided with reference to the diagram in FIG. 7, where example liveness scores for three sequential authentication attempts '1', '2', '3' are plotted together with a threshold value TH for the liveness score.

In the exemplary situation illustrated by the diagram in FIG. 7, the first authentication attempt '1' is based on the first example fingerprint image 56 in which a relatively small portion of the 'good' part 52 of the spoof 50 is included. Therefore the first liveness score $LS_1$ is rather low, far below the liveness threshold TH. The second authentication attempt '2' is based on the second example fingerprint image 58 in which more of the 'good' part 52 of the spoof 50 is included. Therefore the second liveness score $LS_2$ is higher than the first liveness score $LS_1$, but still below the liveness threshold TH. The third authentication attempt '3' is based on the third example fingerprint image 60 in which the 'good' part 52 of the spoof 50 covers almost the entire fingerprint sensor 3. Therefore the third liveness score $LS_3$ is higher than the second liveness score $LS_2$, and may even be higher than the liveness threshold TH as is indicated in FIG. 7.

Considering the relation between the third liveness score $LS_3$, and the previous first $LS_1$ and second $LS_2$ liveness scores, it can be concluded that there is a substantial variation in liveness score between authentication attempts in the sequence of authentication attempts. This variation in liveness scores, optionally together with other factors such as variations in the match score, and/or candidate finger probe movement between authentication attempts, and/or the time between authentication attempts, results, in this case, in the finding that the qualification metric QM indicates a likely spoofing attempt. Therefore, the authentication attempt fails, even though the match score as well as the liveness score $LS_3$ would indicate that there is a match with a live finger.

It should be noted that the steps of the method may be carried out in another order than indicated herein, and that steps may be carried out simultaneously.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A method of authenticating a user by means of a fingerprint authentication system comprising a finger sensing arrangement, said method comprising the steps of, for each authentication attempt in a sequence of authentication attempts:
   receiving a touch by a candidate finger probe on said finger sensing arrangement;
   acquiring a candidate fingerprint image of said candidate finger probe;
   determining an authentication representation based on said candidate fingerprint image;
   retrieving a stored enrollment representation of an enrolled fingerprint of said user;
   determining a match score based on a comparison between said authentication representation and said enrolment representation;
   determining a liveness score for said authentication attempt based on said candidate fingerprint image;
   determining a qualification metric for said authentication attempt based on a relation between the liveness score for said authentication attempt and a liveness score for at least one previous authentication attempt; and
   determining an authentication result for said authentication attempt based on said match score, and said qualification metric.

2. The method according to claim 1, wherein said qualification metric is further based on a relation between the match score for said authentication attempt and a match score for at least one previous authentication attempt.

3. The method according to claim 1, wherein said qualification metric is further based on an estimated movement of said candidate finger probe since a previous authentication attempt.

4. The method according to claim 1, wherein said qualification metric is further based on a time period since said previous authentication attempt.

5. The method according to claim 1, wherein said qualification metric is determined based on the liveness score for said authentication attempt and liveness scores for a plurality of previous authentication attempts.

6. The method according to claim 5, wherein said qualification metric is determined further based on the match score for said authentication attempt and match scores for said plurality of previous authentication attempts.

7. The method according to claim 1, wherein said qualification metric is determined using an empirical model.

8. The method according to claim 7, wherein said empirical model is determined using machine learning.

9. The method according to claim 1, wherein the step of determining said authentication result comprises the step of:
providing, when said match score indicates that said authentication representation matches with said enrollment representation and said qualification metric indicates that a likelihood of an ongoing spoofing attempt is greater than a predefined threshold likelihood, a signal indicating a failed authentication.

10. The method according to claim 1, further comprising the steps of, for each authentication attempt in said sequence of authentication attempts:
when the liveness score for said authentication attempt indicates a likely spoof:
providing a signal indicating a failed authentication;
determining an anti-spoofing representation based on said candidate fingerprint image; and
storing said anti-spoofing representation.

11. The method according to claim 10, further comprising the steps of, for each authentication attempt in said sequence of authentication attempts:
retrieving a stored anti-spoofing representation associated with a previous authentication attempt;
comparing said authentication representation with said anti-spoofing representation associated with the previous authentication attempt; and
when said authentication representation matches with said anti-spoofing representation, providing a signal indicating a failed authentication.

12. A fingerprint authentication system for authenticating a user, comprising:
a fingerprint sensing arrangement;
a memory; and
processing circuitry coupled to said fingerprint sensing arrangement, said processing circuitry being configured to, for each authentication attempt in a sequence of authentication attempts:
determining a qualification metric for the authentication attempt based on a relation between the liveness score for the authentication attempt and a liveness score for at least one previous authentication attempt; and
determining an authentication result for the authentication attempt based on the match score, and the qualification metric.

13. An electronic device comprising;
a fingerprint authentication system according to claim 12; and
a processing unit configured to control said fingerprint authentication system to carry out a fingerprint authentication of a user, and to perform at least one action only upon successful authentication of said user.

* * * * *